(12) United States Patent
Fornari

(10) Patent No.: US 7,689,713 B2
(45) Date of Patent: Mar. 30, 2010

(54) SYSTEM OPERATOR INDEPENDENT SERVER ALERTED SYNCHRONIZATION SYSTEM AND METHODS

(75) Inventor: Stefano Fornari, Piacenza (IT)

(73) Assignee: Funambol, Inc., Redwood City, CA (US)

( * ) Notice: Subject to any disclaimer, the term of this patent is extended or adjusted under 35 U.S.C. 154(b) by 1103 days.

(21) Appl. No.: 11/338,539

(22) Filed: Jan. 23, 2006

(65) Prior Publication Data

US 2007/0198745 A1    Aug. 23, 2007

(51) Int. Cl.
*G06F 15/173* (2006.01)

(52) U.S. Cl. .................. 709/238; 709/227; 709/249

(58) Field of Classification Search .............. 370/252, 370/254, 328, 468; 709/202, 204, 217, 223, 709/225, 230; 711/118, 169; 713/158
See application file for complete search history.

(56) References Cited

U.S. PATENT DOCUMENTS

| | | | |
|---|---|---|---|
| 6,085,192 | A | 7/2000 | Mendez et al. |
| 6,151,606 | A | 11/2000 | Mendez |
| 6,356,529 | B1 | 3/2002 | Zarom |
| 6,708,221 | B1 | 3/2004 | Mendez et al. |
| 6,865,171 | B1 | 3/2005 | Nilsson |
| 6,937,604 | B2 | 8/2005 | Lee et al. |
| 2001/0028636 | A1 | 10/2001 | Skog et al. |
| 2001/0039589 | A1 | 11/2001 | Aho et al. |
| 2002/0116513 | A1 | 8/2002 | Heinonen |
| 2002/0141360 | A1* | 10/2002 | Baba et al. ............ 370/331 |
| 2003/0002635 | A1 | 1/2003 | Koch et al. |
| 2003/0050046 | A1 | 3/2003 | Conneely et al. |
| 2004/0042410 | A1 | 3/2004 | Harris et al. |
| 2004/0128509 | A1 | 7/2004 | Gehrmann |
| 2004/0151186 | A1* | 8/2004 | Akama ................ 370/395.3 |
| 2004/0205208 | A1 | 10/2004 | Koponen et al. |
| 2005/0055448 | A1 | 3/2005 | Kim |
| 2005/0160466 | A1 | 7/2005 | Cho et al. |
| 2005/0223108 | A1 | 10/2005 | Maffeis et al. |
| 2006/0268834 | A1* | 11/2006 | Bajic ..................... 370/352 |

OTHER PUBLICATIONS

OMA Enabler Test Specification for Data Synchronization, V1.2.0, Aug. 17, 2004.

OMA, SyncML Data Sync Protocol, V1.2, Jun. 1, 2004.

(Continued)

*Primary Examiner*—Quang N. Nguyen
*Assistant Examiner*—Charles Murphy
(74) *Attorney, Agent, or Firm*—NewTechLaw; Gerald B. Rosenberg, Esq.

(57) ABSTRACT

A system for enabling server alerted synchronization between a client device and a synchronization server where the network address of the client device is subject to arbitrary reassignment by the network operator without communication with the synchronization server. The client device actively responds to dynamic assignments of a network address to the client device by a network operator by establishing a network connection with and transmitting the network address to a synchronization server operated independent of the network operator. The identification of the synchronization server is determined from configuration data maintained by the client device. The client device then provides for the establishment of a network connection with the synchronization server to support immediate receipt of server alerted synchronization notification messages.

15 Claims, 4 Drawing Sheets

OTHER PUBLICATIONS

OMA, SyncML Device Management Protocol, V1.1.2, Dec. 3, 2003.
OMA, SyncML Device Management Standardized Objects, V1.1.2, Dec. 3, 2003.
OMA, SyncML Device Management Tree and Description, V1.1.2 Dec. 2, 2003.
OMA, SyncML Protocol, v1.1, Feb. 15, 2002.

* cited by examiner

SYSTEM OPERATOR INDEPENDENT SERVER ALERTED SYNCHRONIZATION SYSTEM AND METHODS

BACKGROUND OF THE INVENTION

1. Field of the Invention

The present invention is generally related to dynamic network systems and, in particular, to a system and methods of enabling server alerted synchronization and related data synchronization schemes to operate subject to arbitrary dynamic network addressing changes.

2. Description of the Related Art

The deployment and use of mobile, characteristically wireless, client devices is widespread, growing, and likely to continue to grow at an accelerating pace. Even while the fundamental nature and capabilities of the client devices continue to evolve, substantial investments are being made by network operators to define, install and operate extended wide area communications networks. Given the varied technological, commercial and even geographical interests involved, the network operators and related service providers must contend with a large number of different, and often conflicting, interoperability standards in determining how best to implement specific networks and provide corresponding services. In almost all instances, universal interoperability between different networks, including among the various client and base devices designed for and serviced by the different networks, is precluded. Instead, actual interoperability is achieved functionally through conformance with selected, well-defined standards typically as developed by industry oriented and supported associations.

The Open Mobile Alliance (OMA; www.openmobilealliance.org) is responsible for creating a number of interrelated technology standards intended to facilitate broad, if not global user adoption of mobile data services by specifying market driven mobile service enablers that ensure service interoperability across devices, geographies, service providers, operators, and networks, while allowing businesses to compete through innovation and differentiation. An example is the OMA SyncML Device Management and Data Sync standards described in the current standard proposal documents OMA-TS-DM-Protocol-V1_2-20050826-C and OMA-SyncML-DataSyncProtocol-V1_2-200400601-C. While popularized as the SyncML Protocol, the standards are more formally referred to as implementing the OMA DM and DS protocols. The OMA DM (device management) protocol provides the core mechanisms for over-the-air (OTA) provisioning and configuring of mobile devices, while the OMA DS (data synchronization) protocol describes the basic transactions required for device data synchronization.

Mobile devices are evolving from simple user interface systems to computing platforms capable of supporting a diversity of application programs. The distributed and variably disconnected nature of mobile devices, however, typically requires applications to support a combination of local and remote application specific data storage. These applications must further support synchronization of the client local application data, subject to potential disconnected modification, with remote stored data, typically through a network connected data server. The OMA DS protocol describes a standards-based protocol intended to enable client applications resident on mobile devices to interact and synchronize application data with remote server data systems. The desired user experience is, of course, that any required data synchronization occur transparently and without apparent delay.

The OMA DS protocol proposes a coordinated transport system for messages and responses to establish a transaction session for data synchronization between a mobile device and a synchronization server, typically referred to as a SyncML server. The transport medium is not specified, allowing for different implementations to accommodate different network systems and service offerings. The data difference resolution algorithms used to identify the data exchanges necessary to effect synchronization are also not specified. Different application and service providers are therefore able to implement synchronization algorithms that are the most appropriate for the particular services and applications they support.

The OMA DS protocol implicitly supports both client initiated and server initiated synchronization transactions. For simplicity, application data synchronization is driven by the client application. Server initiated synchronization is achieved by forwarding a synchronization request message from the server to the client to prompt the client application to perform synchronization. A particular limitation of the OMA DS protocol is that the specification does not define the detailed protocol for communicating server alerted synchronization messages to the mobile devices. Rather, the specification specifies that the synchronization server must be able to address messages to particular mobile devices as necessary to perform server alerted synchronization. The specification further defines the form and content of the server alerted synchronization message that must be sent by a SyncML server to trigger a specifically identified mobile device into performing a synchronization transaction. Server alerted synchronization is, of course, highly desired to minimize any apparent delay in presenting updated application specific data to a mobile device user and maintaining the integrity of the information available to other users of the SyncML server.

Conventionally, a network address, most typically an Internet Protocol (IP) address, is used to identify a mobile device in synchronization transactions. For mobile devices capable of being assigned a network address, which includes essentially all current mobile devices capable of data synchronization, a network address is dynamically assigned whenever the mobile device connects to the network. The network address is also dynamically reassigned, with no guarantee of consistency in the value of the IP address provided, whenever the mobile device reconnects with the network, however a particular network operator may define a reconnection. The network operator may also reassign the network address based on criteria exclusively in the control and discretion of the network operator. A mobile device therefore must be capable of operating under the assumption that the assigned network address will be changed arbitrarily without prior notice.

Since there is no specification defined way of providing a synchronization server with the network address of a mobile device, either within or in anticipation of a synchronization transaction, service providers and network operators have resorted to a number of alternative methods. One such method requires proprietary integration of the synchronization servers with the network support servers that provide the network addresses. To illustrate, US Patent Publication 2001/0028636 describes a wireless application protocol (WAP) gateway system that manages the assignment of IP addresses to mobile devices on connection with the attached wireless network. The IP address assigned to a mobile device is recorded against the unique MSISDN identifier of a device in a database available only to servers implemented internal to the gateway system. While IP addresses are generated in a conventional manner, the assignment of IP addresses to mobile devices operating within the network operator network is performed using low-level, typically proprietary protocols. These IP addresses, as assigned, are recorded in a database embedded within the network operator server system.

For a number of reasons, most involving the desire to maintain a commercial advantage over the services provided to or accessible from the mobile devices and security concerns, the IP database internally maintained by the network operator is not publically accessible. Furthermore, network operator systems provide no public notice of IP address assignments, including reassignments, to the network operator managed mobile devices or other third party systems. Without the ability to reliably contact and interact on demand with the mobile devices, which is dependent on a reliable knowledge of the network address of the mobile devices, third party synchronization servers are unable to provide commercially acceptable services. Consequently, only network servers implemented as an integral part of the network operator server systems are able to support data synchronization services. A further undesirable result is that client application data synchronization is limited to only those applications actually supported by the particular network operator and at a cost structure relatively unconstrained by direct competition.

An alternative approach frequently used to support conventional client applications requires the use WAP-push messaging to transfer synchronization notification messages. The use of WAP-push transport from a SyncML server to a mobile device to trigger a synchronization transaction is conformant with the OMA DS protocol specification. Due to the limited data capacity of short message service (SMS) packets, multiple SMS messages must typically be sent to convey a synchronization notification message. The mobile device then responds by creating the network connection with the SyncML server as necessary to conduct the synchronization transaction. The fundamental drawback of this approach is that the SMS messages must route through the network operator WAP gateway. Such messaging services are not free of direct monetary costs. Given the desired frequency of data synchronizations, even nominal use of client applications using server alerted synchronization becomes undesirably expensive.

The need for server alerted synchronization can be avoided, in limited circumstances, by having the mobile device either continuously maintain an active connection to the synchronization servers or periodically poll the servers for updates. Maintaining an active connection has the specific benefit of avoiding any noticeable delay in retrieving application data updates. Any reassignment of the network address will, however, result in the loss of the network connection. Therefore, these systems typically require integration with the network operator system. In any event, the cost, in terms of battery life and server resources, makes maintaining an active connection undesirable.

Having the mobile device poll the server at defined intervals reduces battery drain, as compared to maintaining a continuous connection, but can result in an significantly increased data synchronization latency. If the polling interval is reduced to compensate, then battery life is again compromised and the synchronization servers are required to support a significantly increased load due to the increased rate of network connection setup and tear-down.

Other transport systems for providing synchronization notification messages to mobile devices and of updating synchronization servers are not generally well known. Such systems are typically based on proprietary protocols and integration of server systems within a single provider network. Consequently, there is a need for an open system that allows client devices to update network addresses to synchronization servers interoperably within and across networks independent of the network operator and dedicated system providers.

SUMMARY OF THE INVENTION

Thus, a general purpose of the present invention is to enable the reliable transfer of mobile device network addresses to synchronization servers to support data synchronization interoperably over networks supported by and operationally independent of any network operator.

This is achieved in the present invention by providing a system and methods of enabling server alerted synchronization between a client device and a synchronization server where the network address of the client device is subject to reassignment arbitrarily by the network operator without communication between the network operator and the synchronization server. The client device actively responds to such dynamic network address assignments by establishing a new network connection with and transmitting the network address to the synchronization server independent of the network operator. The identification of the synchronization server is determined from configuration data maintained by the client device. The client device then provides for the establishment of a network connection with the synchronization server to support receipt of server alerted synchronization notification messages.

An advantage of the present invention is that the client device operates to actively enable synchronization server support for the delivery of server alerted synchronization notification messages to the client device. Preestablished internal configuration data is used to identify a set of one or more synchronization servers that can provide data synchronization services for the client applications executed on the client device and, further, may originate server alerted synchronization notifications.

Another advantage of the present invention is that interoperation between client devices and synchronization servers on behalf of application servers occurs without dependency on or coordination with any network operator system. The ability of the client applications to reliably exchange synchronization data is not compromised by the arbitrary assignment and reassignment of the client device network address by a network operator. In addition, by being independent of any network operator, the present invention enables open cost and feature competition between synchronization service providers.

A further advantage of the present invention is that multiple synchronization servers can be leveraged to support data synchronization with individual client devices, thereby ensuring data synchronization transaction availability through synchronization system redundancy and enabling efficient, scaleable, and cost effective use of the synchronization servers.

DETAILED DESCRIPTION OF THE INVENTION

Figure 1:
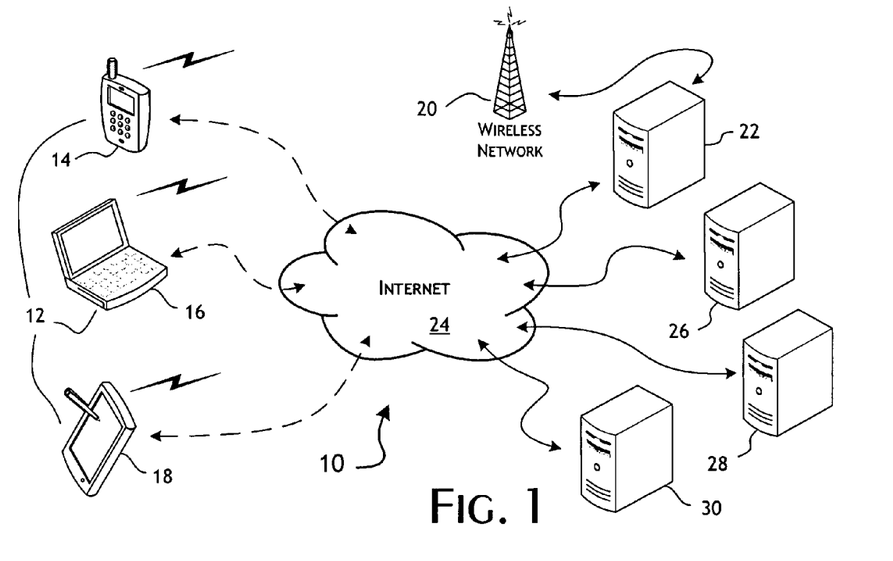
FIG. 1 is a simplified network diagram illustrating the operating environment of the preferred embodiments of the present invention.

A preferred operating environment 10 of the present invention is shown in FIG. 1. As will become clear from the following detailed description of the invention, wherein like reference numerals are used to designate like parts depicted in one or more of the figures, the present invention enhances the ability of service providers to deliver data synchronization services to client devices 12 operationally independent of network operators. In the preferred embodiments, the client devices 12 are typically mobile wireless devices, including cellular telephones 14 and various keyed 16 and pen-based 18 personal information management type computer systems. Communications with the client devices 12 is provided by a wireless network 20, typically cellular in architecture, that is managed and maintained by a network operator, here generally represented by a network operator system 22. Generalized network communications, typically Internet-based, are routed through the network operator system 22 and Internet 24.

A server system 26 is established to provide network based data synchronization services to subscribing mobile devices 12. The server system 26 operates independent of the network operator system 22. For purposes of the present invention, the server system 26 is operationally independent of the network operator system 20 where no network operator specific services are required from the network operator system 20 in order to establish and conduct network communications between the mobile devices 12 and the server system 26. The only essential service of the network operator system 20 is to transport IP data streams between the mobile devices 12 and the server system 26.

In the preferred embodiments of the present invention, the server system 26 implements the SyncML server alerted synchronization protocol, conformant with a current OMA DS Protocol Specification, to enable data synchronization between client application programs as executed on the client devices 12 and one or more application servers 28. Each application server 28 hosts, directly or indirectly, a distributed user application and the centralized user data storage. Typical distributed user applications include conventional mobile email and calendaring applications. Alternately, or in addition, an application server 30 may directly implement the SyncML server alerted synchronization protocol and thereby also operate as a SyncML server for the distributed user applications hosted by the application server 30. Preferably, the SyncML 26, 30 and application servers 28 are also operationally independent of the network operator system 20.

Figure 2:
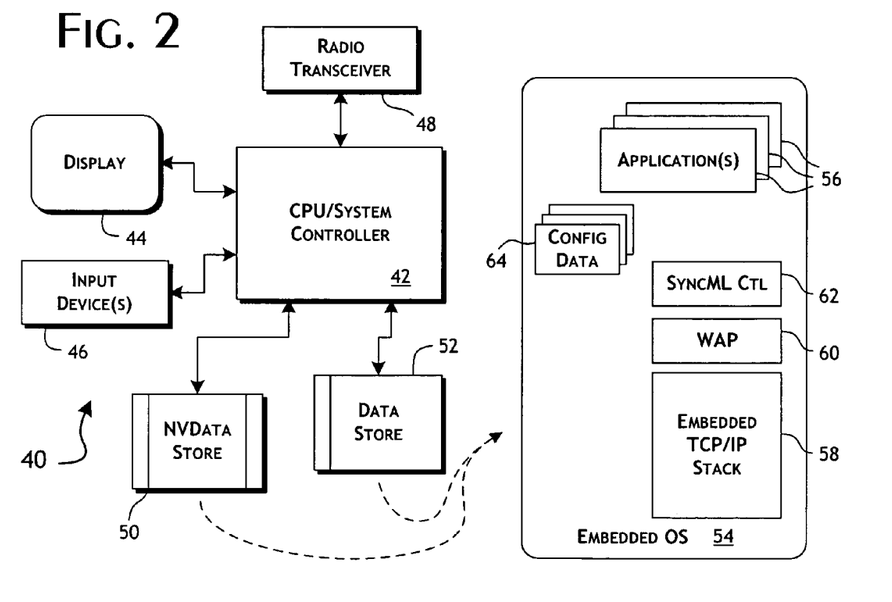
FIG. 2 provides a block diagram of the preferred implementation of the client hardware and software systems used in a preferred embodiment of the present invention.

A preferred architectural implementation 40 of a client device 12 suitable for use with the present invention is shown in FIG. 2. The hardware platform includes a conventional embedded processor control system 42 supporting display 44 and input device 46 interfaces. A conventional radio transceiver 48 enables communications with the applicable wireless network 20. Conventional non-volatile 50 and standard 52 random access memories provide local storage for an embedded operating system 54 and one or more distributed user client application programs 56. While the embedded operating system 54 is typically proprietary, in relevant implementations a basic, standards compliant TCP/IP stack 58 is included to support conventional IP network communications. For the preferred embodiments of the present invention, the TCP/IP stack 58 implementation supports operation as a network server for inbound IP connections. While new client device 12 implementations are increasingly incorporating server-capable TCP/IP stacks 58, the present invention also detects and supports use of client devices 12 capable of client-only TCP/IP operation.

A WAP client layer 60 is typically present to support low-level configuration and control of the client device 12. The network operator server system 22 is typically implemented as a WAP gateway to provide the services required for conventional subscriber identification of the client device 12 and, relevant to the present invention, assign an IP address to the client device 12. The assignment of the IP address is, in effect, performed arbitrarily by the network operator server 22, both in terms of the specific IP address value and the timing of assignments. Conventionally, an IP address will be assigned by the network operator server 22 to a client device 12 each time the client device 12 connects to the wireless network 20. Additionally, the network operator is free to assign a new network IP to the client device 12 at any time. While reassignments typically occur in response to movements by the client device 12 within the network topology of the wireless network 20, as may be forced by practical network implementation constraints, network address reassignments are ultimately determined based on criteria determined by the network operator. Conventionally, client devices 12 are required to immediately accept and use the network operator assigned IP address.

A SyncML controller layer 62 is provided in accordance with the present invention to implement and manage initialization for the SyncML server alerted synchronization protocol. In accordance with the present invention, the SyncML controller layer 62 further interoperates with the TCP/IP stack 58 to monitor assignments and reassignments of the network IP and autonomously update the SyncML servers 26, 30 operationally independent of the network operator server system 22. The network identity of the SyncML servers 26, 30 may be specified as fixed values coded into the SyncML controller layer 62 or included as configuration data 64 associated either with the SyncML controller layer 62 or applications 56. Where stored as fixed values, conventional network routing and load-balancing techniques may be used to manage the operation of the identified SyncML servers 26, 30. By alternately storing the identity of the SyncML servers 26, 30 as configuration specific data 64, different specifically identified SyncML servers 26, 30 can be discretely assigned as desired to particular client devices 12 and individual client applications 56.

Figure 3:
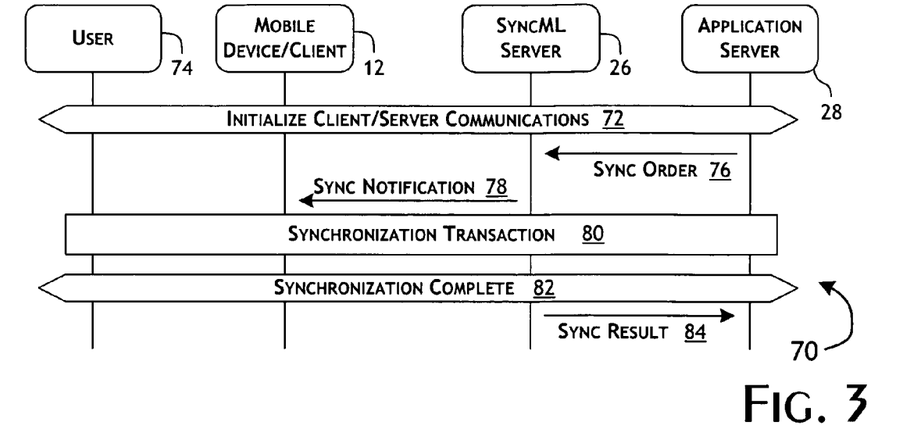
FIG. 3 is a message sequence diagram illustrating a data synchronization transaction including propagation of a synchronization notification message as performed by a preferred embodiment of the present invention.

The initialization function of the present invention is shown in FIG. 3 the context of a server alerted synchronization transaction 70. An initialization phase 72 is required to identify a client device 12 to a SyncML server 26, 30 to enable a client application 56 present on the client device 12 to exchange synchronization data with a corresponding application server 28. For the preferred embodiments of the present invention, the initialization phase 72 is responsible for transferring the current assigned network IP address and a unique device identifier, such as the MSISDN of the client device 12, to the SyncML server 26, 30. Where non-IP based network protocols are used, the assigned network protocol device identifier is provided. Also, rather than providing a device specific identifier, a set of one or more client application unique identifiers can provided in correspondence with the network address. In each case, the SyncML server 26, 30 is provided with initialization information sufficient to establish communications with a specific client device 12.

In accordance with the SyncML server alerted synchronization protocol, synchronization order messages 76 are provided by an application server 28 to a SyncML server 26. An equivalent message is passed internal to the SyncML and application server 30. A synchronization order message 76 is generated with respect to a client application 56 whenever the application server 28 receives or develops data appropriate for synchronization with a corresponding client application 56. The synchronization order messages 76 preferably includes a synchronization identifier, such as an MSISDN, that can be uniquely associated with the desired client device 12 by the SyncML server 26, 30. A synchronization notification message 78, also referred to as a server synchronization package #0, is then forwarded to the client device 12. In response, the client device 12 initiates a synchronization transaction 80. Typically, within the synchronization transaction 80, each client application 56 is polled internal to the client device 12 to perform an application specific data synchronization check and update operation. After the client applications 56 have completed synchronization 82, a final synchronization result message 84 is returned to the initiating application server 28.

Figure 4:
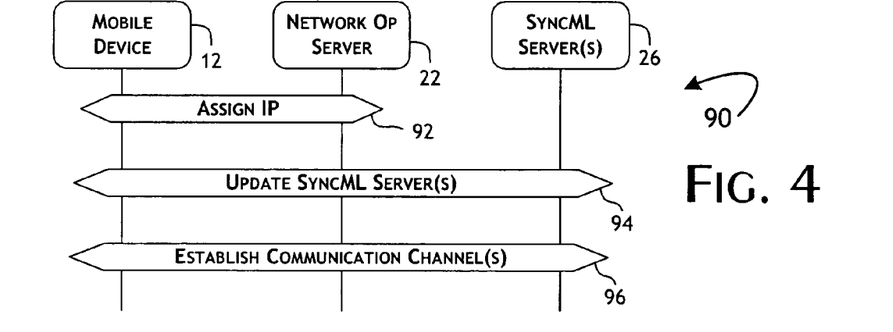
FIG. 4 is a message sequence diagram illustrating a synchronization server update transaction as performed by a preferred embodiment of the present invention.

Viewed as a sequence of message transactions 90 as shown in FIG. 4, the initialization and, as necessary, reinitialization of client server communications 72 is initiated in response to the assignment of a network address 92 by the network operator server 22. In response, the SyncML controller layer 62 transmits messages 94 to the SyncML servers 26, 30 identified from the local configuration data 62. Depending on the networking capabilities of the client device 12, communications channels are established 96 with the SyncML servers 26, 30 to allow the client device 12 to receive subsequent synchronization notification messages 78 as originated by the SyncML servers 26, 30.

Figure 5:
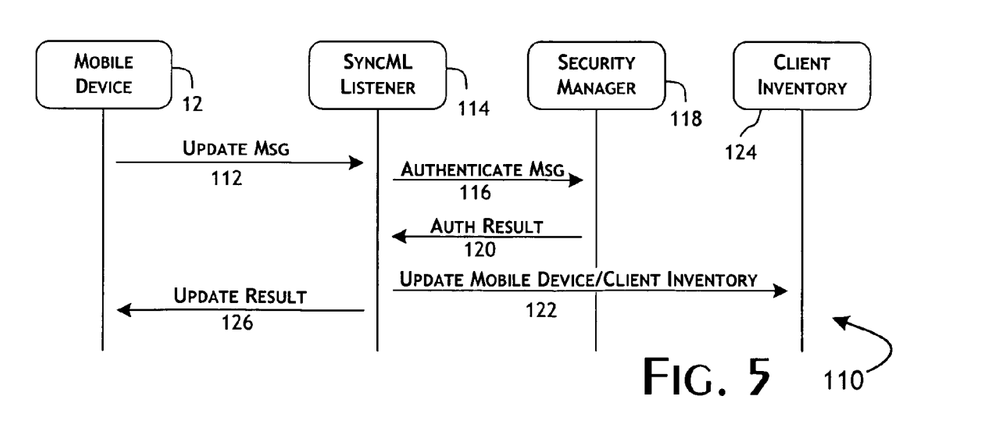
FIG. 5 is a state diagram illustrating a preferred implementation of a device inventory update operation performed by a synchronization server in a preferred embodiment of the present invention.

The preferred operation 110 of a SyncML server 26, 30 in response to an update message 112 from a client device 12 is shown in FIG. 5. Preferably, a SyncML server 26, 30 implements a network connection listener 114 at a network address, such as "http://sync4j.com/syncml", well known to client devices 12. Alternately, the applicable SyncML server 26, 30 network address is provided to and stored as configuration data 64 upon subscription by the client device 12 to the SyncML services available through the corresponding SyncML server 26, 30. Upon receiving an update message 112, the SyncML server 26, preferably performs an authentication transaction with a security manager 118. For the preferred embodiments of the present invention, the update message 112 is a standard OMA DS protocol client alert message presenting a custom alert code. Authentication can then be performed by a basic-type authentication call 116 on the local OMA DS protocol defined security manager 118. Alternately, degrees of greater security and authentication control may be added by, for example, requiring a secure socket layer (SSL) connection to the connection listener 114 and providing for LDAP or active directory-based authentication of the security credentials provided in the client alert message.

Provided that the update message 112 is properly authenticated 120, an update transaction 122 is then performed to add or update the client device 12 in an inventory database 124 preferably maintained by the SyncML server 26, 30. The inventory database 124 preferably stores, at a minimum, the current network IP address correlated against the unique identifier of client device 12. Preferably, the current network IP address is provided by the client device 12 as part of the update message. This is the current assigned IP address of the client device 12. Additionally, an apparent network IP address is determinable from the network connection with the SyncML listener 114. This apparent network IP address can used to identify the potential presence of a firewall, gateway, router or other proxy device in the network path. The assigned and apparent IP addresses are preferably recorded in the inventory database 124 for use, as appropriate, by the SyncML server 26, 30 in subsequently establishing and accepting connections with the client device 12.

The client device identifier is also included in the client alert message and is preferably checked against a local inventory list of the client devices permitted access to the SyncML server 26, 30. This local serviceable client device list is preferably created and maintained through an administrative process in response to subscription by the client device 12 to the SyncML services available through the corresponding SyncML server 26, 30. An update status response 126 is then returned to the client device 12. For the preferred embodiments of the present invention, the status response 126 presents a status code to indicate success (200), use-polling (300), use-continuous-polling (301), unauthorized (401), device not found (404), or server error (500). The use-polling and use-continuous-polling status codes are invoked where the SyncML server 26, 30 recognizes from the IP address included in an update message that a client device 12 has been assigned an RFC 1918 private network or otherwise non-publicly accessible IP address. The use-polling status code requests the client device 12 to periodically establish a new network connection with the SyncML server 26, 30 to check for updates. The use-continuous-polling status code requests the client 12 to periodically establish a network connection that is maintained for a defined period, covering multiple update checks, thereby lessening the connection setup and tear-down load on the SyncML servers 26, 30. In alternate embodiments, the response message may also return administrative information including an update of the network address to be used by a client device 12 in connecting with the network listener 114.

Figure 6:
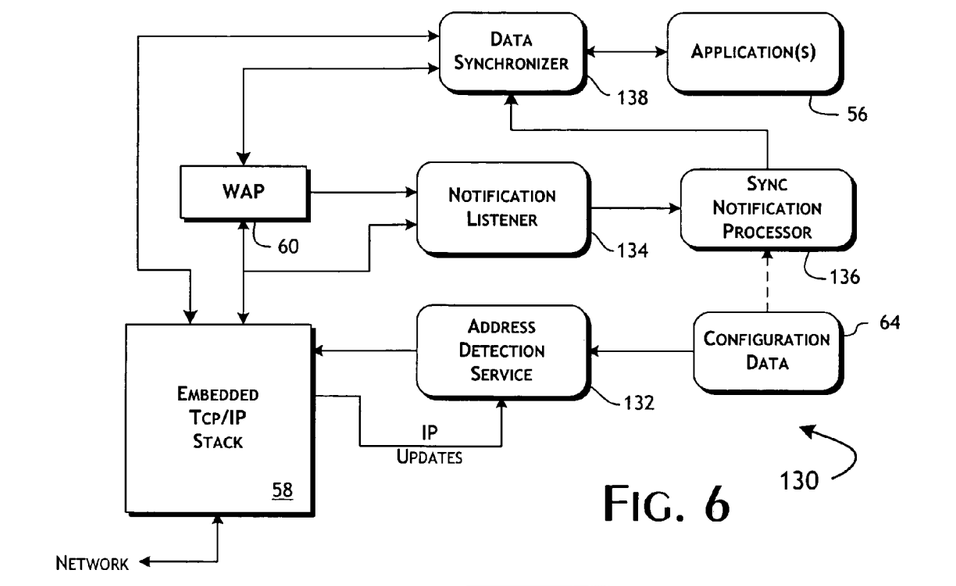
FIG. 6 is a block diagram describing functional operation of a client device implementing a preferred embodiment of the present invention.

A preferred system architecture 130 detailing a preferred implementation of the SyncML controller layer 62 within a client device 12 is shown in FIG. 6. The SyncML controller layer 62 includes an address detection service 132 that monitors the address assigned to the client device. Depending on the existing capabilities of the embedded TCP/IP stack 58, the address detection service 132 registers with the stack 58 to receive event-type notifications whenever a new network address is assigned. Alternately, the address detection service 132 periodically checks for changes in the current network address in use by the TCP/IP stack 58. The specific behavior of the address detection service 132, such as type and frequency of network address checks, may be controlled by configuration data 64. Whenever use of a new network address is detected, an IP notification alert message is sent to the SyncML servers 26, 30. The IP notification alert message is a standard OMA DS protocol alert message presenting the new network address and, optionally, the MSISDN of the client device 12. A preferred form of the IP notification alert message is as follows:

```
<Alert>
    <CmdID>5</CmdID>
    <Data>745</Data>
    <Item>
        <Source>ip</Source>
        <Data>80.125.0.120</Data>
    </Item>
    <Item>
        <Source>msisdn</Source>
        <Data>+39111223344</Data>
    </Item>
</Alert>
```

The SyncML controller layer 62 also includes SyncML notification listener 134 and notification processor 136. For the preferred embodiments of the present invention, the SyncML notification listener 134 is configured to listen for SyncML notification messages received through a direct TCP connection or, as a conventional alternative, through a WAP connection where the notification message is embedded in a standard series of WAP-Push messages. Each SyncML notification message is processed by notification processor 136 to initiate a synchronization transaction 80. For the presently preferred embodiments, the notification processor 136 coordinates a data synchronizer 138 that provides a control interface to the client applications 56 through which the notification processor 136 can initiate the performance of an application specific data synchronization transaction for each client application 56. Client data synchronization transactions are then performed by the client applications 56 using connections established through the WAP layer 60 or directly through the embedded TCP/IP stack 58 as determined by the client applications 56. In alternate embodiments of the present invention, where multiple SyncML servers 26, 30 may be used, configuration data 64 may be checked by the notification processor 136 or individual client applications 56, to identify the client applications 56 associated with the particular SyncML server 26, 30 that sourced a current SyncML notification message. Synchronization transactions are thereby initiated selectively for client applications 56 against only known SyncML servers 26, 30.

Figure 7:
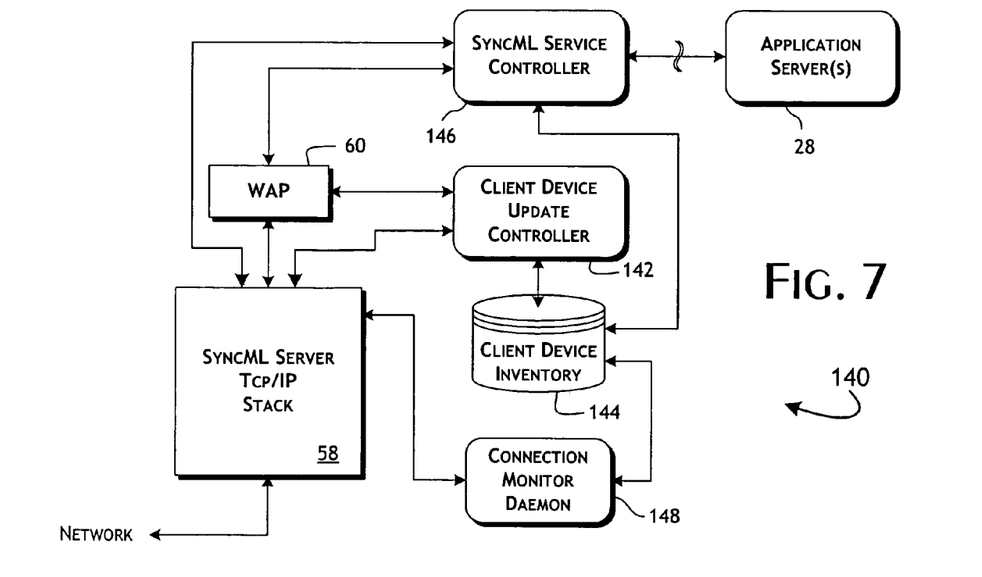
FIG. 7 is a block diagram describing functional operation of a synchronization server system implementing a preferred embodiment of the present invention.

A preferred architecture 140 for SyncML servers 26, 30 is shown in FIG. 7. A client device update controller 142 preferably maintains a connection listener for IP notification alert messages. For the preferred embodiments of the present invention, the IP notification alert messages are provided through a TCP connection created on demand by a client device 12. Each IP notification alert message is presented in the form of a single stateless HTTP POST request. Alternately, IP notification alert messages can be received through the WAP layer 60. The client device update controller 142 is responsible for authenticating each received IP notification alert message and, where the IP notification alert message is authenticated, updating the client device inventory 144 maintained by the SyncML server 26, 30. The structure of the device inventory 144 preferably includes an indexed association between unique client device 12 identifiers and the current network addresses of the client devices 12. Additional information may be kept as desired for management of the inventory, including current connection status, and time of last connection, the type and status of the last synchronization operation, and the device capabilities of the client device 12 including, for example, the manufacturer, model and version of the client device 12.

Data synchronization transactions 80 are conducted by the client devices 12 and are, in general, client application specific. In general, a data synchronization transaction begins with a synchronization initiation request being forwarded by a client application 56 to a SyncML server 26, 30. The synchronization request is parsed by the SyncML service controller 146 to determine the application server 28 identified by the request. The SyncML service controller 146 is responsible for establishing a network connection and forwarding the data synchronization request to the identified application server 28. For the preferred embodiments of the present invention, the SyncML service controller 146 operates as a portal for synchronization transactions 80. Where a client device 12 is capable of listening for network connections, an application server 28 may choose to independently establish a network connection to the client device 12 for performance of the data synchronization transaction 80 specific to the client application 56 as serviced by the particular application server 28.

In an alternate embodiment of the present invention, a connection monitor service 148 may be periodically executed by the SyncML server 26, 30 to maintain the client device inventory 144. In particular, where an open connection is maintained by the SyncML server 26, 30 with client devices 12, the network connection may not be closed when the client device 12 is inactivated or otherwise becomes unavailable. The connection monitor service 148 operates to periodically check current connections with the client devices 12 where identified from the client device inventory 144 as being active. Network connections are closed and corresponding server resources released for unreachable client devices 12. The client device inventory 144 is correspondingly updated.

Figure 8:
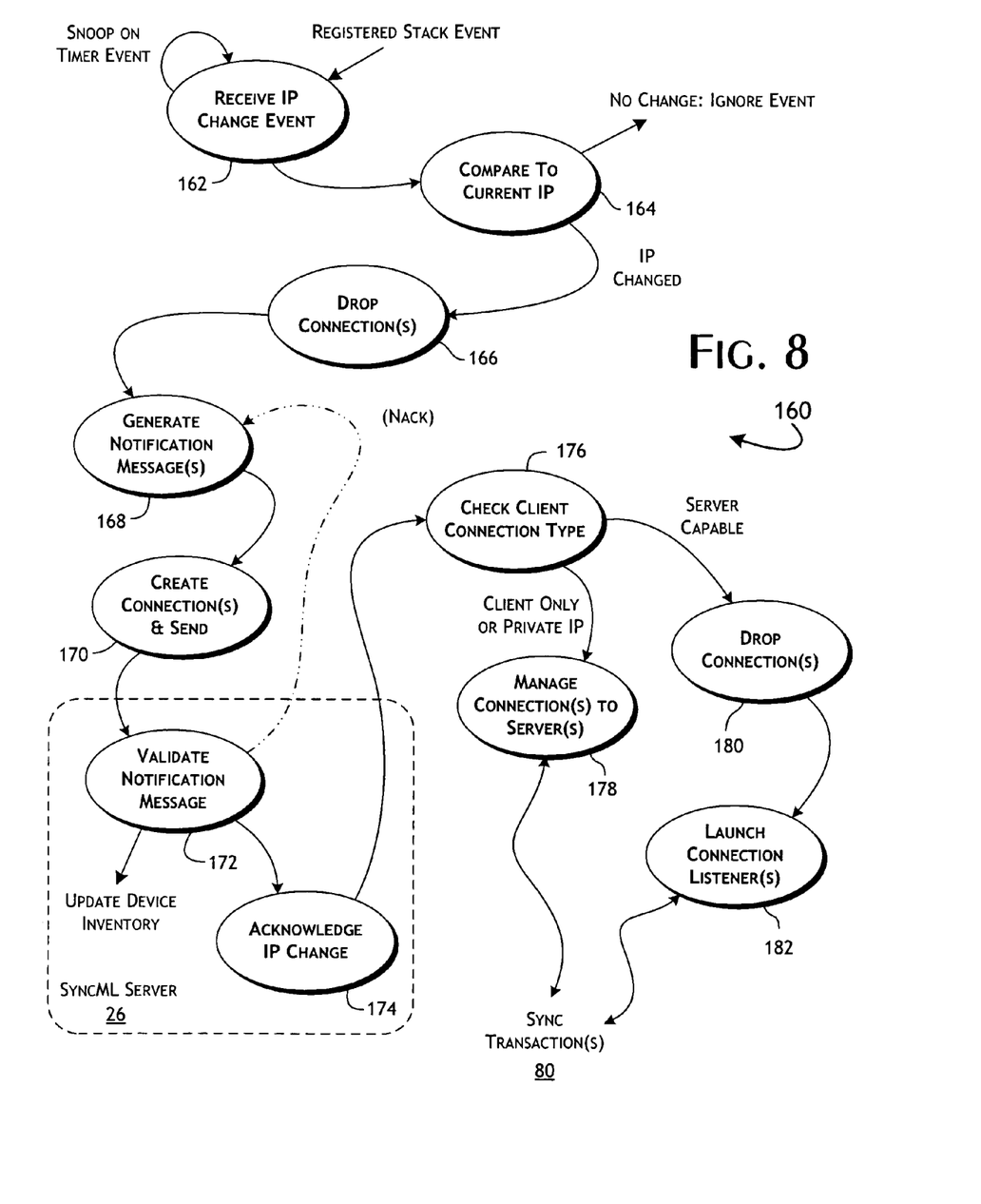
FIG. 8 is a flow diagram illustrating the interoperation of a client device and synchronization server in accordance with a preferred embodiment of the present invention.

The client communications initialization process 160 implemented by the preferred embodiments of the present invention is shown in FIG. 8. On a client device 12, the address detection service 132 monitors 162 for any apparent change in the assigned network address. Detection is premised on timer events or on explicit network address change events generated by the embedded TCP/IP stack 58. In both cases, the address detection service operates to periodically compare 164 the current network address with an internally maintained copy of the last assigned network address. Comparison is necessary in the case of timer events and preferred in the case of stack 58 generated events to screen for events that do not reflect an actual network address value change.

When a change in the network address is detected, any outstanding network connections are dropped 166. Any active data synchronization transactions will have already stopped due to the change in network address. The address detection service 132 then generates 168 an IP alert notification message for each of the SyncML servers 26, 30 known to the client device 12. A network connection to each of the known SyncML servers 26, 30 is then created and the respective IP alert notification messages are sent 170. If a network connection cannot be established, the address detection service 132 will periodically retry creation of the network connection. Where a connection is established but no acknowledgment of an IP alert notification message is received by the address detection service 132, the IP alert notification message is periodically regenerated and resent.

On a SyncML server 26, 30, when an IP alert notification message is received 172 by the update controller 142, the message is validated. Where valid, the client device inventory 144 is updated and an appropriate acknowledgment message is returned 174 to the client device 12.

Once the address detection service 132 on a client device 12 has received acknowledgment that a SyncML server 26, 30 has accepted an IP address update, the capabilities of the embedded TCP/IP network stack 58 are evaluated 176 to determine network connection management. Where the embedded TCP/IP network stack 58 lacks server capabilities or where the client device 12 assigned IP address is private, the network connection to the SyncML server 26, 30 is managed 178 by the client device 12. Client management modes of managing the network connection include maintaining the existing network connection for use in subsequently receiving server alerted synchronization messages from the SyncML server 26, 30 by the client device 12, periodically polling the SyncML servers 26, 30 potentially dependent on time-schedules determined from the configuration data 64, or using a continuous-polling technique where a client initiated network connection is maintained for a defined period of time determined from the configuration data 64, dropped, and then re-established after another period of time. If the embedded TCP/IP network stack 58 is capable of acting as a network server and a public IP has been assigned, the current network connection with the SyncML server 26, 30 is dropped 180. A connection listener 182 is then launched 182 to receive connection requests from the SyncML server 26, 30 whenever a SyncML server 26, 30 is requested to send a server alerted synchronization message to the client device 12.

Thus, a system and methods of providing for the establishment of reliable network communications between a client device and SyncML server independent of the network operator system while allowing for arbitrary network address changes imposed by the network operator has been described. While the present invention has been described particularly with reference to the presently defined OMA DS protocol, the present invention will be applicable to subsequent revisions and additions to the OMA DS protocol and related protocols used to support data synchronization with mobile communications devices. Additionally, the client devices need not be mobile or wireless. The present invention is also applicable to computer systems where distributed clients, both wired and wireless, are subject to effectively arbitrary assignment of network addresses, including those that may freely transition between wired and wireless networks.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method enabling server alerted synchronization between a client device and a synchronization server where the network address of the client device is subject to arbitrary reassignment by the network operator without communication with the synchronization server, said method comprising the steps of:
   a) receiving, by a client device having a first network address and operative to execute a client application, a second network address in replacement of said first network address, wherein said second network address is dynamically assigned by a network operator, wherein said client application is responsive to synchronization data exchanged with an application server, and wherein said application server is controlled independent of said network operator;
   b) transmitting, by said client device, said second network address upon dynamic assignment, to a synchronization server, wherein said synchronization server operates independent of said network operator; and
   c) providing, through communication between said synchronization server and said application server, for the establishment of a network connection dependent on said second network address to exchange said synchronization data between said client device and said application server.
   d) terminating, by said client device in response to the receipt of said second network address, a first network connection dependent on said first network address established to exchange said synchronization data between said client device and said application server, wherein said step of providing provides for the establishment of a second network connection dependent on said second network address to exchange said synchronization data between said client device and said application server.

2. The method of claim 1 further comprising the step of maintaining, by said synchronization server, a device inventory associating a predetermined device identifier with said second network address, wherein said predetermined device identifier is obtained by said synchronization server independent of said network operator.

3. The method of claim 2 wherein said step of providing is responsive to the provision of said predetermined device identifier from said application server to said synchronization server.

4. The method of claim 2 wherein said step of providing provides for the establishment of said second network connection through said synchronization server.

5. The method of claim 2 wherein said step of providing provides for the establishment of said second network connection directly routed between said client device and said application server relative to said synchronization server.

6. A method enabling data synchronization over a network between a client application and a corresponding application server where the network address of the client device is subject to dynamic reassignment, said method comprising the steps of:
   a) detecting, on a client device, a dynamic reassignment of the network address of said client device, said dynamic reassignment replacing a first network address with a second network address as arbitrarily determined by a network operator server;
   b) disabling, in response to said step of detecting, network communications using said first network address between said client device and a synchronization server;
   c) communicating, by said client device and independent if said network operator server, said second network address to said synchronization server; and
   d) enabling, for transfer of synchronization data between a client application executed by said client device and an application server, network communications with said client device using said second network address, wherein said step of communicating provides said second network address in a network message, said method further comprising the step of validating, by said synchronization server, said network message, said step of enabling being conditioned on said step of validating.

7. The method of claim 6 further comprising the steps of
   a) storing, by said synchronization server for a plurality of client devices, a set of network addresses in correspondence with said plurality of client devices, said plurality of client devices including said client device and said set of network addresses including said second network address; and
   b) updating, by said synchronization server, said set of network addresses conditionally in response to said step of validating.

8. The method of claim 7 wherein said step of communicating includes the step of identifying, by said client device, a plurality of synchronization servers, said step of communicating including communicating said second network address to each of said plurality of synchronization servers wherein each of said plurality of synchronization servers perform the steps of validating, storing and updating with respect to said client device.

9. A client device capable of synchronizing client application data with application servers that are independent of the network operator system that manages the assigned network address of the client device, said client devise comprising a processor system including a microprocessor, a memory, and a network controller, coupleable to a communications network, having an assigned network address, said processor system being operative to receive autonomously provided updates to said assigned network address from a network operator system, said processor system further including a control program stored in said memory and executable by said microprocessor, said control program being operative to provide, in response to said autonomously provided updates, said assigned network address through said communications controller to a synchronization server to enable said synchronization server, exclusive of said network operator system, to perform a server alerted synchronization transaction with said application program using said assigned network address as subject to said autonomously provided updates, wherein said server alerted synchronization transaction is performed through a network connection and wherein said control program is further operative to drop and resume said network connection in response to any said autonomously provided updates occurring during said server alerted synchronization transaction, whereby resumption of said network connection is enabled by a corresponding provision of said assigned network address to said synchronization server, and wherein said control program is operative to establish a control network connection with said synchronization server to provide said assigned network address to said synchronization server, and wherein said control network is further operative to establish a listener for a synchronization server initiated network connection through which to perform said server alerted synchronization transaction.

10. The client device of claim 9 wherein said control program is operative to establish a control network connection with said synchronization server to provide said assigned network address to said synchronization server, wherein said control network connection is maintained by said client device for performance of said server alerted synchronization transaction.

11. A system enabling data synchronization between client applications executed on client devices and corresponding application servers independent of the network operator system that provides dynamic assignment of network addresses to the client devices, said system comprising:
   a) an application server operative to transfer synchronization data with respect to a client application through a communications network;
   b) a synchronization server coupleable to said communications network, said synchronization server including a network address store that provides for the storage of a plurality of network addresses identified with a like plurality of client devices; and
   c) a client device coupleable to said communications network, said client device having an assigned network address subject to dynamic reassignment by a network operator system independent of said synchronization server, said client device being operative, in response to changes in said assigned network address, to provide said assigned network .address to said synchronization server, said client device being further operative to execute said client application, said client application being responsive to a synchronization notification specific to said assigned network address to perform a synchronization transaction with respect to said synchronization server, wherein said client device is operative to establish a first network connection with said synchronization server maintained sufficient to provide said assigned network address, said client device being further operative to establish a listener for a second network connection to receive said server alerted synchronization notification message.

12. The system of claim 11 wherein said synchronization server is operative exclusive of communication with said network operator system.

13. The system of claim 12 wherein said synchronization server is operative to verify said assigned network address as provided by said client device.

14. The system of claim 13 wherein said synchronization server is operative to generate and send a server alerted synchronization notification message to said client device at said assigned network address.

15. The system of claim 14 wherein said client device is operative to establish a network connection with said synchronization server to provide said assigned network address, said client device being further operative to maintain said network connection to receive said server alerted synchronization notification message.

* * * * *